United States Patent [19]

Cayou

[11] 4,236,309
[45] Dec. 2, 1980

[54] FLEXIBLE LINE TRIMMER WITH LINE FEEDING APPARATUS

[75] Inventor: James S. Cayou, Hurst, Tex.

[73] Assignee: K & S Industries, Inc., Fort Worth, Tex.

[21] Appl. No.: 881,174

[22] Filed: Feb. 27, 1978

[51] Int. Cl.³ .............................................. A01D 50/00
[52] U.S. Cl. ........................................ 30/276; 56/12.7
[58] Field of Search .................... 30/276, 347; 56/12.7

[56] References Cited

U.S. PATENT DOCUMENTS

| | | | |
|---|---|---|---|
| 1,954,051 | 4/1934 | Moon | 403/349 |
| 4,020,552 | 5/1977 | Mizuno | 30/276 |
| 4,114,269 | 9/1978 | Ballas, Sr. | 30/276 |
| 4,134,204 | 1/1979 | Perdue | 30/276 |
| 4,151,646 | 5/1979 | Lane | 30/276 |
| 4,161,820 | 7/1979 | Moore | 30/276 |
| 4,167,812 | 9/1979 | Moore | 30/276 |
| 4,168,572 | 9/1979 | Ewing | 30/276 |
| 4,169,311 | 10/1979 | Evenson | 30/276 |

FOREIGN PATENT DOCUMENTS 852150  7/1977  Belgium ..................................... 30/276

*Primary Examiner*—Jimmy C. Peters
*Attorney, Agent, or Firm*—Robert A. Felsman

[57] ABSTRACT

A flexible line trimmer for cutting vegetation having a rotary drive for swinging a nylon line. A housing with an actuator button on its bottom is connected to the rotary drive. A spool for the line is located in the housing. An actuator mechanism is connected between the button and the spool for feeding the line out in increments when the button is depressed. Also, the housing is connected to a drive shaft of the rotary drive by a cap. The housing and the cap have sidewalls that overlap each other. Lugs are molded to one of the sidewalls, and mating slots in the other sidewall provide a quickly releasable connection of the housing to the cap.

10 Claims, 3 Drawing Figures

FLEXIBLE LINE TRIMMER WITH LINE FEEDING APPARATUS

BACKGROUND OF THE INVENTION

1. Field of the Invention

This invention relates in general to flexible line trimmers for cutting vegetation and in particular to one that has a mechanism for feeding line out while still rotating.

2. Description of the Prior Art

One type of weed and grass trimmer in use utilizes a monofilament nylon line for cutting vegetation. The line is wound on a spool that is rotated by a rotary drive. A free traveling end extends outward from the spool a few inches, cutting vegetation in its path.

One disadvantage of the trimmer is that the line wears fairly rapidly. To extend the line back to its proper length, most devices have a feeding mechanism that requires the operator to stop the motor. The operator then turns the trimmer over, manipulates a release, then grasps the free end of the line and pulls more out. This is a time consuming operation and a nuisance.

One proposal to provide for line feeding while still rotating is shown in U.S. Pat. No. 3,298,911. It requires, however, a hollow shaft, gripping members and a linkage extending up the handle. It is desirable to have less complexity.

Another disadvantage with filament trimmers is that at times the line will break off inside the housing, requiring the operator to rethread the line out through the housing aperture. Most housings are connected to the shaft by a threaded nut that bears against the bottom of the housing or the spool. It is desirable to make the housing more quickly releasable.

SUMMARY OF THE INVENTION

It is accordingly a general object of this invention to provide an improved line feeding means for a flexible line vegetation trimmer.

It is a further object of this invention to provide a flexible line trimmer with improved means for attaching the housing to the shaft that allows quick access for rethreading.

In accordance with these objects, a filament trimmer is provided that has a mechanism that feeds line out while rotating when the trimmer is bumped against the ground. A spool for the line is located in a housing. A button is mounted below the bottom of the housing and is axially movable with respect to it. An actuator mechanism is connected between the bottom and the spool for allowing the housing to rotate a selected amount with respect to the spool when the button is depressed. The actuator mechanism will release only a selected amount of line for each button depression, regardless of the length of time that the button is depressed. The housing is connected to the motor drive shaft by a cap. The cap and housing have overlapping walls, with lugs and slots for retaining them together. The housing may be quickly released for access to the spools by rotating the lugs from the slots.

DESCRIPTION OF THE PERFERRED EMBODIMENT

Figure 1:
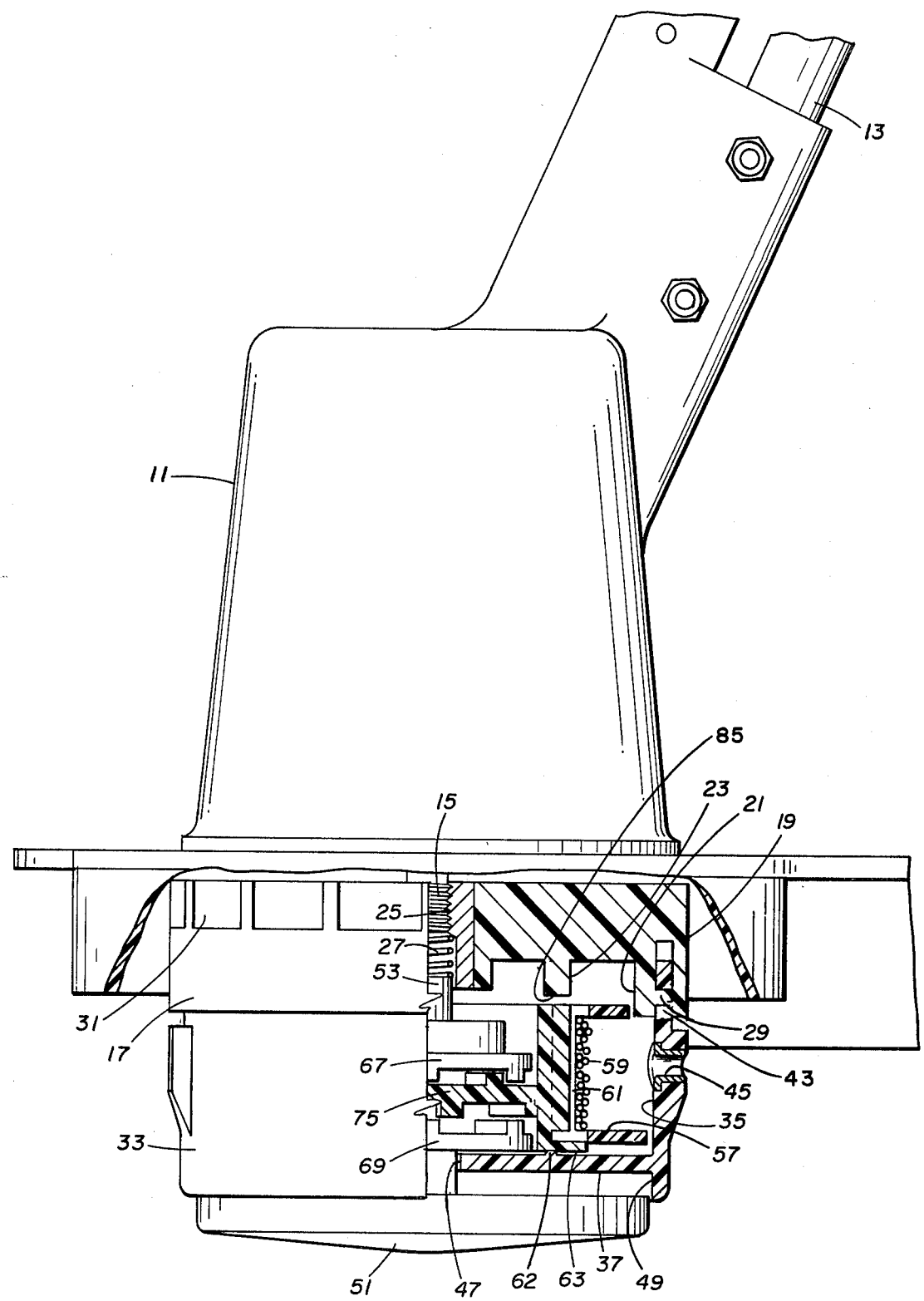
FIG. 1 is a partial side elevational view of a filament trimmer constructed in accordance with this invention with portions of the device in section.

Referring to FIG. 1, a portion of a flexible line trimmer is shown, including the electrical motor housing 11, which encloses an electrical motor (not shown). A handle 13 allows the operator to carry and use the device while standing. A drive shaft 15 depends from the motor and is screwed into a cap 17 for rotating it.

Figure 2:
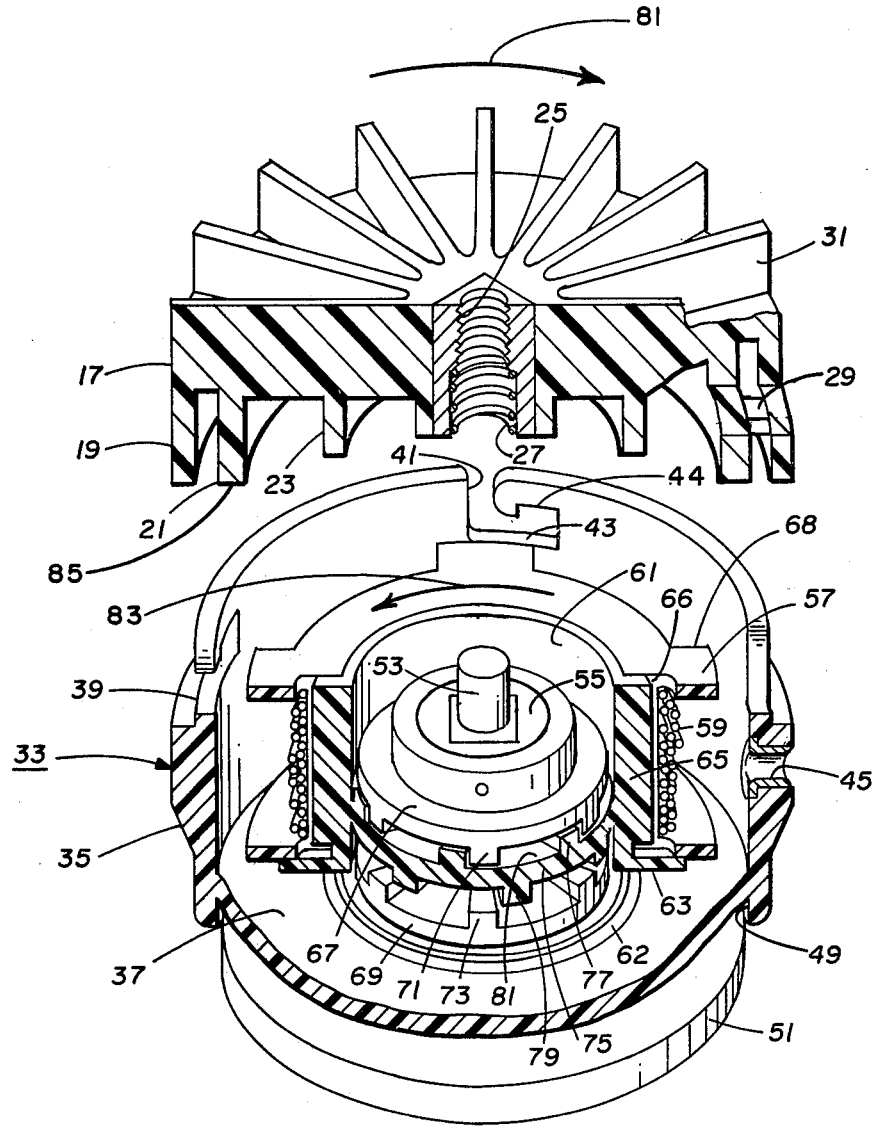
FIG. 2 is a perspective view of the housing and inner components of the filament trimmer of FIG. 1, with the cap shown detached, and portions in section.

Referring also to FIG. 2, cap 17 is cylindrical, with an outer sidewall extending downward. An inner sidewall 21 is concentric with the outer sidewall 19 and is spaced inward on the bottom side of cap 17. Another inner sidewall 23 is concentric with sidewalls 19 and 21 and is spaced inward from them. Cap 17 has an axial bore with threads 25 for connection to drive shaft 15. A coil spring 27 fits within the bore and bears against a shoulder at the base of the threads 25. Four equally spaced lugs 29 are molded between inner sidewall 21 and outer sidewall 19. Lugs 29 are radially oriented. A plurality of fins 31 are formed in a radial pattern on the top of cap 17 for cooling the motor.

A housing 33 is releasably connected to cap 17. Housing 33 has a cylindrical sidewall 35, a closed base or bottom 37 and an open top. Four slots 39 are formed on the upper edge of sidewall 35 for mating with lugs 29. Each slot is generally L-shaped with an entrance portion 41 extending downward from the upper edge parallel with drive shaft 15, and a locking portion 43 extending at a right angle to the entrance 41, with a vertical notch or portion 44 at the end of portion 43. Locking portion 43 extends in the direction of rotation so that the rotational force urges lugs 29 against the end of the locking portion 43. The width of slot 39 is adapted to closely receive a lug 29, and the distance between cap outer sidewall 19 and inner sidewall 21 is selected to closely receive housing sidewall 35.

An aperture or metal eyelet extends through housing sidewall 35. A square aperture 47 is located in the center of the housing bottom 37. Housing sidewall 35 overhangs the housing bottom 37 a short distance, providing a recess 49.

A circular actuator button 51 is adapted to be received within recess 49. It is connected to a threaded shaft 53 that extends upward through square aperture 47. Shaft 53 fits within a square aperture in a mandrel 55. The portion of shaft 53 within mandrel 55 and aperture 47 is square. The top of shaft 53 above mandrel 55 is cylindrical and bears against spring 27 to bias the button 51 downward.

A cartridge or spool 57 having nylon filament line 59 wound around it is carried in the housing 33 by a hub 61. Hub 61 is concentric with the housing 33 and has a flange 63 at its base that is in sliding contact with a small rib 62 formed concentrically on the housing bottom 37. Spool 57 is closely received over the hub 61 and carried by flange 63. A pair of keys 65 are formed on hub 61 and are received within mating slots 66 in the spool 57 to prevent rotation of the spool with respect to the hub. The upper rim of spool 57 has cutout portions 68 to allow access to the end of the line and to the eyelet 47, without removing the spool.

An actuator means for allowing the housing to rotate with respect to the spool when the button is depressed is enclosed within hub 61. It includes an outer gear having upper and lower rings 67, 69 rigidly connected to shaft 53. Lower ring 69 is molded integrally with mandrel 55. Upper ring 67 slides over mandrel 55. A roll pin locks the upper ring 57 to the mandrel 55, and locks the mandrel 55 to shaft 53 for axial movement therewith. Rings 67, 69 are spaced apart on shaft 53 and have teeth 71, 73 that face each other. Each tooth lies on a radial line, has a flat top, vertical sides, and gradually increases in width from the center outward. Teeth 71, 73 have spaces between them equal to the width of three teeth. Each tooth 71 lies in the same vertical plane with a tooth 73.

An inner gear 75 is an intregally molded segment of the hub 61 sidewall, and is spaced between the upper and lower rings 67, 69. It has a center aperture (not shown) for slidingly receiving mandrel 55 and is independent of movement with respect to the upper and lower rings. Inner gear 75 has upper and lower teeth 77, 79 of substantially the same dimension as teeth 71, 73. Teeth 77, 79 lie on radial lines and have spaces between them equal to the width of three teeth. Teeth 77, 79 are staggered or offset from each other, with an upper tooth 77 formed in the center of a space between two lower teeth 79.

Figure 3:
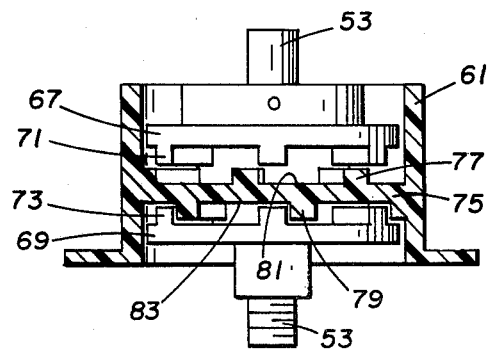
FIG. 3 is a partially sectioned view of the actuator mechanism of the filament trimmer of FIG. 1.

The diameter of inner gear 75 is slightly larger than the upper and lower rings 67, 69 to allow the rings to rotate within hub 61. The vertical space between the upper and lower ring teeth 71, 73 is substantially equal to the inner gear thickness, less the height of one of the inner gear teeth. As shown in FIGS. 1 and 2, when the upper surface 81 of the inner gear is in contact with the upper ring teeth 71, the tops of the inner gear lower teeth 79 will be spaced slightly above the tops of the lower ring teeth 73. Correspondingly, as shown in FIG. 3, when the inner gear lower surface 83 is in contact with the lower ring teeth 73, the tops of the inner gear upper teeth 77 will be slightly below the tops of the upper ring teeth 71. Consequently, the inner and outer gears are free to incrementally rotate with respect to each other until either the upper set of teeth are in engagement with each other or the lower set of teeth are in engagement with each other. There is no intermediate position that allows the inner and outer gears to rotate completely free with respect to each other.

In operation, the free end of the line is threaded through eyelet 45 for a distance that may be approximately three to six inches. The electric or gasoline motor rotates the housing, swinging line 59 in a path to cut vegetation. FIGS. 1 and 3 show the device when the actuating mechanism and button 51 are in the lower position, being urged into that position by spring 27. In the preferred embodiment, the rotation is clockwise as viewed from the top, indicated by arrow 81. Spool 57 is prevented from movement with respect to housing 33 when the button 51 is in the lower position by shaft 53, locked to square aperture 47, and by upper ring teeth 71, which bear against the inner gear upper teeth 77. The inner gear, being molded to hub 61, drives the spool 57 through hub keys 65. Thus, in normal rotation, the upper set of teeth of the inner and outer gears will be engaged, with the upper ring teeth 71 serving as a latching member and the inner gear upper teeth 77 serving as drive teeth.

When the line wears so as to require more swinging length, the button is depressed by bumping it against the ground momentarily. This places the actuator in the upper position. Shaft 53 moves upward with respect to housing 33 until the lower ring teeth 73 contact the inner gear lower surface 83. At this point, which is shown in FIG. 3, the upper ring teeth 71 will be disengaged from the inner gear upper teeth 77. This momentarily disengages the hub and spool from rotation with the housing. The hub and spool will slip with respect to the housing as indicated by arrow 83 (FIG. 2) since they are no longer driven until the lower ring teeth 73 come into engagement with the inner gear lower teeth 79. Engagement of the lower set of teeth stops the rotation of the housing with respect to the spool momentarily. However spring 27, which urges the button back into the lower position, will quickly disengage the lower set of teeth from each other. The hub and spool will slip again with respect to the housing until the upper ring teeth 71 again contact the inner gear upper teeth 77.

This two-step feedout occurs very quickly because of the high rotational speed, which may be seven thousand to nine thousand rotations per minute. It feeds out a measured amount of line proportional to the width of four teeth regardless of how long the button is depressed or how long it takes spring 27 to urge the button back into the lower position. The lower sets of teeth are thus only momentarily engaged to serve as incremental means for allowing a selected amount of line to be fed out.

The upper edge of hub 61 is flush with the upper rim of spool 57. When the actuator mechanism is in the lower position, as shown in FIG. 1, a clearance of about 0.090 inch exists between the upper edge of hub 61, and the lower surface 85 of inner sidewall 23. This clearance, and the length of notches 44 in slots 39 allow the housing 33 to move axially upward with respect to cap 17 when the button 51 is depressed. This axial movement, repeated each time line is advanced, prevents sonic welding of the housing to the cap due to vibration. A clearance of approximately 0.030 inch exists between the outer edge of spool 57 and the inside wall of inner sidewall 21.

Should the line break off inside housing 33, it must be rethreaded through eyelet 45. The motor is stopped and the trimmer turned over to expose housing 33. Housing 33 is depressed and rotated clockwise a short distance, then pulled away from cap 17, disengaging slots 39 from lugs 29. The free end of the line is located and threaded through eyelet 45, access being provided by the cutout portion 68. If desired, the spool can be removed entirely from the hub 61 by pulling upward.

It should be apparent that an invention having significant improvements has been provided. The filament trimmer has an actuator for feeding out additional line that operates simply by bumping the trimmer against the ground. Incremental means prevents too much line from feeding out, which can cause overheating of the motor. Access to the spool for rethreading is quickly provided by the lugs and slot locking arrangement.

While the invention has been shown in only one of its forms, it should be apparent to those skilled in the art that it is not so limited but is susceptible to various changes and modifications without departing from the spirit thereof.

I claim:

1. An apparatus for cutting vegetation with a rotating nonmetallic flexible line comprising:
   a rotary drive means for rotating a free end of the line;

a housing having a bottom and connected with the rotary drive means for rotation therewith;

a spool hub carried inside the housing at the bottom;

a spool adapted to be wound with the line and carried by the hub for rotational movement therewith;

an outer gear, positioned inside the hub, having an upper ring with downwardly facing teeth and spaces therebetween, and a lower ring connected to the upper ring for movement therewith, having teeth facing upward with spaces therebetween, the teeth of the lower ring being in the same vertical planes as the teeth of the upper ring;

an inner gear, positioned between the upper and lower rings, having upper teeth and spaces therebetween on its upper side adapted to engage the teeth of the upper ring, and lower teeth and spaces therebetween on its lower side adapted to engage the teeth of the lower ring, each upper tooth being formed above one of the spaces on the lower side; the inner gear and the outer gear being axially and rotatably moveable with respect to each other; the distance between the teeth of the upper and lower rings being substantially equal to the thickness of the inner gear less the height of one of its teeth;

an actuator button located below the bottom of the housing and axially moveable with respect to the housing between a lower and an upper position;

an actuator member bearing against the button and extending through the bottom of the housing into contact with one of the gears for axially moving one of the gears with respect to the other gear when the button is moved from its lower position, thereby removing the upper teeth of the inner gear from engagement with the teeth of the upper ring to allow the gears to rotate with respect to each other until the lower teeth of the inner gear engage the teeth of the lower ring; and bias means for urging the actuator member downward, causing the lower teeth of the inner gear to disengage the teeth of the lower ring, allowing rotation of the gears with respect to each other until the upper teeth of the inner gear again engage the teeth of the upper ring.

2. The apparatus according to claim 1 wherein the spaces between the teeth of the gears are at least equal to the width of three teeth.

3. An apparatus for cutting vegetation with a rotating nonmetallic flexible line comprising:

a rotary drive means for rotating a free end of the line;

a housing having a bottom and connected with the rotary drive means for rotation therewith;

a spool hub carried inside the housing at the bottom;

a spool adapted to be wound with the line and carried by the hub for rotational movement therewith;

an actuator button located below the bottom of the housing and axially moveable with respect to the housing between an upper and a lower position;

an actuator shaft extending upward from the button through an aperture in the bottom and into the center of the hub, the actuator shaft being axially moveable with respect to the housing, but carried by the housing for rotation therewith;

an outer gear, rigidly carried by the actuator shaft inside the hub, having an upper ring with downwardly facing teeth equally spaced apart from each other at least three times the width of each tooth, and a lower ring, carried by the actuator shaft, with upwardly facing teeth spaced apart from each other and lying in the same vertical planes as the upper teeth;

an inner gear rigidly carried by the hub between the upper and lower rings, having upper teeth and spaces therebetween on its upper side adapted to engage the teeth of the upper ring when the button is in the lower position, and lower teeth with spaces therebetween on its lower side adapted to engage the teeth of the lower ring when the button is in the upper position, the spaces between the upper and lower teeth being equal and at least three times the width of each tooth, with each upper tooth being formed above one of the spaces on the lower side; the distance between the teeth of the upper and lower rings being substantially equal to the thickness of the inner gear less the height of one of its teeth; and bias means for urging the actuator shaft downward, allowing the housing to rotate an increment with respect to the hub as the button is moved from the lower position to the upper position, and urged back again to the lower position.

4. The apparatus according to claim 3 wherein the aperture in the bottom of the housing for the actuator shaft is rectangular.

5. The apparatus according to claim 3 wherein the upper and lower rings and the inner gear are circular, with radial teeth.

6. An apparatus for cutting vegetation with a rotating nonmetallic flexible line comprising:

a rotary drive means for rotating a free end of the line and having a depending drive shaft;

a cap secured to the drive shaft for rotation therewith, the cap having a cylindrical sidewall;

a housing having a cylindrical sidewall and an open top for overlapping engagement with the cap;

a plurality of lugs attached to and extending radially from one of the sidewalls, the other of the sidewalls having a plurality of mating slots for receiving lugs for releasably coupling the housing to the cap, each slot having an entrance extending from the edge of the sidewall to a locking portion extending circumferentially from the entrance a selected distance in the direction of rotation;

an actuator button located at the bottom of the housing and axially moveable with respect to the housing between a lower and an upper position;

bias means cooperating with the button for urging it into the lower position;

a spool adapted to be wound with the line and carried in the housing; and actuator means, connected between the spool and the button, for allowing the housing to rotate with respect to the spool when the button is forced from the lower position for feeding additional line outward and for connecting the spool to the housing for rotation therewith when the button is in the lower position.

7. The apparatus according to claim 6 wherein the locking portions of the slots have a vertical portion of vertical dimension greater than the height of the lugs for allowing the housing to move axially with respect to the cap when the button is forced from the lower position.

8. An apparatus for cutting vegetation with a rotating nonmetallic flexible line comprising:

a rotary drive means for rotating a free end of the line and having a depending drive shaft;

a cap member secured to the drive shaft for rotation therewith;

a housing member having a cylindrical sidewall and an open top;

retention means for securing the housing member to the cap member, the retention means including a plurality of lugs attached to one of the members, the other member having a plurality of slots extending circumferentially a selected distance, each lug positioned for insertion into one of the slots, each lug and slot having means for allowing the lug to enter the slot, for allowing the cap and housing members to be rotated with respect to each other until the lug reaches the circumferential end of the slot, and for retaining the housing member to the cap member while the lug is at the circumferential end of the slot;

a spool adapted to be wound with the line and carried in the housing;

actuator means, moveable between a first position and a second position by bumping the apparatus on the ground, connected between the spool and the housing member, for causing the spool and the housing member to rotate in unison in the first position and for allowing the spool and housing member to rotate with respect to each other a selected amount to feed out additional line when moving from the first position to the second position and from the second position back to the first position; and bias means for urging the actuator means into the first position.

9. An apparatus for cutting vegetation with a rotating nonmetallic flexible line, comprising:

a rotary drive means for rotating a free end of the line and having a depending drive shaft;

a cap member secured to the drive shaft for rotation therewith;

a housing member having a cylindrical sidewall and an open top;

retention means for securing the housing member to the cap member, the retention means including a plurality of lugs attached to one of the members, the other member having a plurality of slots extending circumferentially a selected distance, each lug positioned for insertion into one of the slots, each lug and slot having means for allowing the lug to enter the slot, for allowing the cap and housing members to be rotated with respect to each other until a lug reaches the circumferential end of the slot, and for retaining the housing member to the cap member while the lug is at the circumferential end of the slot;

a spool carried in the housing and adapted to be wound with the line;

a first set of drive teeth in the housing member and carried by the apparatus for rotation with the drive shaft;

a second set of drive teeth in the housing member, spaced vertically from the first set of drive teeth and carried by the apparatus for rotation with the drive shaft;

a first set of driven teeth, carried in the housing member for rotation with the spool and adapted to selectively engage the first set of drive teeth for transmitting rotary motion from the drive shaft to the spool;

a second set of driven teeth, carried in the housing member for rotation with the spool and spaced vertically from the first set of driven teeth for selectively engaging the second set of drive teeth for transmitting rotary motion from the drive shaft to the spool;

the drive and driven teeth being axially moveable with respect to each other by tapping the apparatus on the ground, the teeth being positioned so that only one, but always one, set of drive teeth are in engagement with a set of driven teeth; and bias means for urging the first set of drive teeth into engagement with the first set of driven teeth, tapping of the apparatus on the ground releasing the first set of drive teeth from the first set of driven teeth and causing the second set of drive teeth to engage the second set of driven teeth, the bias means then forcing the first set of drive teeth to re-engage the first set of driven teeth, causing rotation of the spool with respect to the housing member and feeding out additional line;

the retention means allowing the housing member to move slightly toward the cap member each time the apparatus is tapped on the ground, to reduce the sonic welding.

10. An apparatus for cutting vegetation with a rotating nonmetallic flexible line comprising;

a rotary drive means for rotating a free end of the line;

a housing connected with the rotary drive means for rotation therewith;

a spool having a hub and adapted to be wound with the line and carried by the apparatus in the housing;

an outer gear, positioned inside the hub, having an upper ring with downwardly facing teeth and spaces therebetween, and a lower ring connected to the upper ring for movement therewith, having teeth facing upward with spaces therebetween;

an inner gear, positioned between the upper and lower rings, having upper teeth and spaces therebetween on its upper side adapted to engage the teeth of the lower ring, each upper tooth being formed above one of the spaces on the lower side; the inner gear and the outer gear being axially and rotatably moveable with respect to each other; one of the gears being a driving gear and being carried by the apparatus for rotation in unison with the rotary drive means; the other gear being connected to the hub, and being driven by the driving gear;

an actuator member located below the spool and connected to one of the gears for axially moving one of the gears with respect to the other gear when the actuator member is moved upward with respect to the housing, the gears being positioned so that the upper teeth of the inner gear disengage with the teeth of the upper ring to allow the gears to rotate with respect to each other until the lower teeth of the inner gear engage the teeth of the lower ring; and bias means for urging the actuator member downward, causing the lower teeth of the inner gear to disengage the teeth of the lower ring, allowing rotation of the gears with respect to each other until the upper teeth of the inner gear again engage the teeth of the upper ring, allowing the spool to slip with respect to the housing to feed out additional line.

* * * * *